United States Patent [19]

Soltysyk

[11] 4,371,633
[45] Feb. 1, 1983

[54] COATING COMPOSITION FOR ROADS AND OTHER SURFACES COMPRISING CHLORINATED RUBBER, CHLORINATED PARAFFIN AND AMORPHOUS SILICA

[76] Inventor: Alex N. Soltysyk, 1111 Woodlawn Dr., Newcastle, Ind. 47362

[21] Appl. No.: 258,903

[22] Filed: Apr. 30, 1981

[51] Int. Cl.³ .................. C08K 5/01; H02G 15/00; C08K 3/36
[52] U.S. Cl. .................................... 523/172; 524/466
[58] Field of Search ............... 523/172; 524/466; 260/28.5 B, 31.8 H, 31.8 DR, 33.6 AQ

[56] References Cited

U.S. PATENT DOCUMENTS

| | | | |
|---|---|---|---|
| 1,661,828 | 3/1928 | Hopkinson | 264/319 |
| 1,860,651 | 5/1932 | Bradley et al. | 8/94.21 |
| 1,904,576 | 4/1933 | Twiss et al. | 260/139 |
| 2,268,415 | 12/1941 | Morway et al. | 260/28.5 D |
| 2,402,189 | 6/1946 | Soday | 260/28.5 B |
| 2,421,409 | 6/1947 | Brookman et al. | 260/31.8 H |
| 2,545,977 | 3/1951 | Smith | 260/23.7 N |
| 2,727,934 | 12/1955 | Brown | 260/737 |
| 3,169,935 | 2/1965 | Sherliker et al. | 260/28.5 D |
| 3,689,441 | 9/1972 | Hori et al. | 260/28.5 D |
| 3,708,470 | 1/1973 | Hall | 260/28.5 B |
| 3,849,354 | 11/1974 | Strecker et al. | 260/28.5 B |
| 4,018,730 | 4/1977 | McDonald | 260/28.5 AS |
| 4,137,204 | 1/1979 | McDonald | 260/28.5 AS |

OTHER PUBLICATIONS

Chem. Abst. 90-123282 (1979) 12-9-78 Sato et al., (J78141355) Ashai Denka, "Compositions of Plasticizers".
Chem. Abst. 94-66939(1981) "Adhesive Composition", Oct. 30, 1980.

*Primary Examiner*—Paul Lieberman
*Assistant Examiner*—H. J. Lilling
*Attorney, Agent, or Firm*—James J. Brown

[57] ABSTRACT

A coating composition is described which is suitable for use on road surfaces, floors, driveways, and similar surfaces and comprises chlorinated rubber, a plasticizer component and an organic solvent. The composition also advantageously may contain powdered, amorphous silica. Preferred in the present invention is about equal amounts by weight of chlorinated rubber and a mixture of solid and liquid chlorinated paraffins as plasticizers, a minor amount of powdered amorphous silica and a mixture of aromatic and chlorinated aliphatic organic solvents.

2 Claims, No Drawings

COATING COMPOSITION FOR ROADS AND OTHER SURFACES COMPRISING CHLORINATED RUBBER, CHLORINATED PARAFFIN AND AMORPHOUS SILICA

BACKGROUND OF THE INVENTION

The present invention is directed to a coating composition which when applied to the surface of a road or similar surface effectively seals that surface to prevent water, heat, and deleterious and corrosive material from penetrating to the road material itself. The present invention further provides a protective road surface which gives good traction even when wet and retards removal of volatile components from the road material.

The frequent and often rapid deterioration of even the most carefully laid road or similar surfaces has long presented an expensive and vexatious problem both for the motorist whose car may be damaged by hitting ruts and potholes and for local Governments which must expend substantial sums of money each year to repair these road surfaces. Much of the deterioration of road surfaces which occurs is due to a combination of corrosive chemicals such as salt and water which penetrate the road surface to cause deterioration of the underlying material. Intense sunlight as well as extremes of hot or cold also play an important factor in the destruction of road surfaces.

Various materials have been proposed, literally for centuries, both for paving materials themselves and as surfacing compositions. These materials have frequently included asphaltic compositions; and in some instances rubber based materials have been added, especially to improve traction and wear of the road surface. As evidenced, however, by the continuing deterioration of roads throughout the country, these materials have not been altogether successful in preventing the damage which annually occurs, especially following severe winter weather conditions.

U.S. Pat. No. 4,137,204 to McDonald describes a method for emulsifying an asphalt-rubber paving repair material into a stable thixotropic emulsion for repairing cracked road ways and pavements.

U.S. Pat. No. 4,018,730, also to McDonald describes a similar asphalt-rubber emulsion useful as a pavement repair material.

U.S. Pat. No. 1,661,828 to Hopkinson describes a paving material having a non-slip surface which includes among its various components vulcanizable rubber and paraffin wax.

It is also known in the art to prepare various rubber emulsions as coating materials for surfaces such as paper, leather and fabrics to impart such characteristics as fireproofing and water resistance.

U.S. Pat. No. 2,727,934 to Brown for example, describes chlorinated rubber coating material which is applied as an emulsion to such surfaces.

U.S. Pat. No. 2,545,977 to Smith also describes a composition containing rubber and chlorinated paraffin which is useful to impart fire resistance to various polymeric materials.

U.S. Pat. No. 1,860,651 to Bradley et al discloses a waterproofing composition for leather which contains latex, gasoline, paraffin wax and paraffin oil.

U.S. Pat. No. 1,904,576 to Frank et al describes a waterproof composition of paper which comprises rubber and paraffin wax.

It is an object of the present invention to provide a novel surfacing composition which effectively seals road or other surfaces such as driveways and garages to prevent water corrosive materials and heat from penetrating to cause deterioration.

It is a further object of the present invention to provide a surfacing material which is easily applied to the surface and will quickly dry without presenting any problems of an environmental nature.

It is yet a further object of the present invention to provide a surfacing material which prevents deterioration of the underlying material by leaching out or evaporation of materials within that surfacing composition and which will not crystallize, shrink, freeze, melt or peel off.

SUMMARY OF THE INVENTION

In accordance with the present invention, a coating composition is provided which meets the above objectives and produces a tough, durable, easily applied material suitable for application to roads, driveways and similar surfaces. The composition of the invention comprises a mixture of up to about 50 percent by weight of a chlorinated rubber and compatible plasticizer, both dissolved in a suitable organic solvent.

Preferably, the composition of the invention comprises about 10-25 weight percent, most preferably about 15-18 weight percent chlorinated rubber and about 10-25 weight percent plasticizer. Thus, the proportion by weight of rubber and plasticizer can be about equal. The balance of the composition is made up of a suitable organic solvent, although it may be desirable to incorporate other components in minor amounts, such as for example, 2-15 weight percent, preferably 8-12 weight percent, silica powder, which is especially preferred in the present composition to improve tear resistance, elasticity, adhesion and heat resistance.

Chlorinated rubber suitable for use in the present invention can be natural or synthetic rubber which has been subjected to chlorination according to known procedures. Typical of natural rubbers are hevea rubber, balata, gutta percha, and synthetic rubbers such as polybutadiene and butadiene copolymers. Most preferred for use in the present invention is chlorinated isoprene having a chlorine content of about 64 to 70% chlorine and a viscosity of 4–300 cps at 20% concentration in toluene.

The important characteristics of these chlorinated rubbers to be useful in the present invention is that they be chemically inert and resistant to such materials as alkalies, acids, water, salt, light and petroleum based substances. They should also possess good adhesion to road surfaces, be quick drying, non-inflammable, and non-toxic, resist fungus and mold growth and have low moisture permeability.

Suitable plasticizers for use in the present invention are those which are compatible with the chlorinated rubber and which improve durability and flexibility without significant loss of strength. The plasticizer should have good solubility in the solvent used, stability, chemical resistance, color retention and sufficient volatility to enhance drying. Preferred plasticizers for use in the present invention are chlorinated paraffins which are long chain hydrocarbons and which are most preferably employed as a mixture of solid and liquid chlorinated paraffin. Thus, the total content of plasticizer used in the present invention advantageously is about 8-20, preferably 12-15 weight percent solid chlorinated paraffin having a chloride content of about 69–73 percent, such as "chlorowax 70" manufactured by Diamond Shamrock, Inc., and 2–5, preferably 3–4, weight percent liquid chlorinated paraffin having a chlorine content of 40–44 percent. A particularly preferred liquid chlorinated paraffin for use in the present invention has a chloride content of 42 percent and a viscosity at 25° C. of 26–29 poises, and is sold under the trade name "Clorafin 40" by Hercules Inc.

Other liquid plasticizers which can be used in the present invention include phthalate esters, vegetable oils in blown and dehydrated form such as linseed, solid paraffin, soybean, castor, corn, olive oils, adipates, and nitrates.

In the practice of the present invention it is also highly desirable to incorporate into the composition about 2–15 percent by weight of hydrated amorphous silica powder. As heretofore noted, inclusion of this material in the composition of the invention improves tear resistance, elasticity, adhesion and heat resistance. The hydrated, amorphous silica used in the invention should have a particle size of about 20–50 millimicrons, preferably 35–45 millimicrons. Typical of commerically available products which are suitable is "Hi-Sil EP", marketed by PPG Industries and having a particle size of 40 millimicrons.

While various individual organic solvents can be used in the present invention, it is preferred to use a combination of halogenated and non-halogenated hydrocarbon solvents in amounts of 20 to 50 percent by weight of each. Typical of the hydrocarbons useful in the present invention are both aliphatic and aromatic halogenated hydrocarbons such as alkylene halides of 1 to 8 carbons such as ethylene dichloride, trichloroethylene and methylene chloride, alkane halides of 1 to 8 carbons such as trichloroethane, dichloropropane, n-butyl bromide and chloroform and chlorobenzene.

Of the non-halogenated solvents typical solvents include benzene, alkylated benzene with alkyl group of 1 or 2 carbons, such as toluene, and related aromatic compounds such as xylene, nitrobenzene, anisole, benzonitrile, styrene and pyridine. In addition aliphatic solvents of up to 10 carbon atoms, ethers such as cellosolve, butyl cellosolve, amides such as dimethyl formamide, dimethyl sulfoxide, and esters such as ethyl benzoate, ethyl acetate, butyl acetate, cellosolve acetate, propyl acetate, and diethyl carbonate can be used. Ketones such as acetone, methyl ethyl ketone, diisobutyl ketone, diethyl ketone, cyclohexanone, and cycloheptanone are useful. Mixtures of various liquid hydrocarbons can also be employed as solvents according to the present invention. Typical of such mixtures are so-called "mineral spirits" comprising $C_8$–$C_{12}$ straight chain aliphatic hydrocarbons.

The important consideration in the selection of an appropriate solvent or combination of solvents is that it be capable of dissolving and keeping dissolved the solid components of the composition. Further, the solvent component should be relatively volatile and should evaporate quickly from the composition once it is applied without weakening or changing the film produced. Of course, the solvent should also be non-toxic and not irritating.

The components of coating composition of this invention can be mixed together in the following exemplary manner:

The chlorinated rubber is dissolved in the solvent first, with the said plasticizer then being added followed by the liquid plasticizer component and finally the silica powder. Actual mixing should continue until a homogenous composition is achieved.

EXAMPLE 1

15 weight percent, based on the total composition, of a chlorinated isoprene having a chlorine content of 64–65 percent and a viscosity at 20% concentration in toluene of 9–14 cps (Parlon S-10, Hercules, Inc.), was dissolved in 40 weight percent xylene. 12 weight percent solid chlorinated paraffin having a chlorine content of 70 percent (Chlorowax 70, Diamond Shamrock, Inc.) was then added and stirring continued until the paraffin dissolved. 2 weight percent liquid chlorinated paraffin having a 40 percent chlorine content and a viscosity at 25° C. of 26–29 poises (Clorafin 40, Hercules, Inc.) was added along with 30 weight percent methylene chloride. Mixing was continued for about 20 minutes until the components were blended into a homogenous composition.

The composition was then spread over a 4 square yard area of asphalt road surface and allowed to dry. The road surface including the coated area were subjected to extremes of weather for a seven months period which spanned winter and to relatively heavy automotive usage. No deterioration was observed in the treated area which continued to exhibit good water resistance. The surrounding untreated road surface, however, at the end of the seven months period began to exhibit cracks and signs of deterioration due to wear and the effect of the elements.

EXAMPLE 2

The mixing procedures of Example 1 were repeated to prepare the following composition, with the silica powder being the last added component.

15 weight percent chlorinated isoprene as in Example 1

12 weight percent solid chlorinated paraffin as in Example 1

3 weight percent liquid chlorinated paraffin as in Example 1

35 weight percent xylene 25 weight percent methylene chloride 10 weight percent powdered, hydrated amorphous silica (Hi-Sil Ep, PPG Inc.) having an average particle size of about 40 millimicrons.

Following mixing, the homogenous composition was applied in an even coat to a 2 square yard area of an interior concrete floor surface and allowed to dry. The resulting surface has exhibited good traction, even when wet, and good wear resistance and water repellancy.

EXAMPLE 3

Satisfactory results were obtained using the coating composition of Example 1, but with a solvent mixture of 44 weight percent acetone and 16 weight percent of mineral spirits comprising a mixture of $C_8$–$C_{12}$ straight chain aliphatic hydrocarbons, replacing the xylene-methylene chloride.

It will be understood that the coating composition of the present invention is not limited in its applications to road surfaces, but can advantageously be employed on other rigid surfaces where sealing against moisture, corrosive substances and the effect of the elements is desirable. Typical of such uses are driveways, garage floors, walk-ways or other interior floor surfaces and work surfaces.

I claim:

1. A coating composition adapted for application to the surface of a road or driveway comprising about 10 to 25 weight percent chlorinated rubber, 8 to 20 weight percent solid chlorinated paraffin, 2 to 5 weight percent liquid chlorinated paraffin, 2 to 15 weight percent powdered amorphous silica, 20 to 50 weight percent chlorinated hydrocarbon solvent and 20 to 50 weight percent non-chlorinated solvent.

2. The coating composition of claim 1 wherein said chlorinated rubber is chlorinated isoprene having a chlorine content of 64 to 70 percent, said silica has a particle size of 20–50 microns, said chlorinated solvent is methylene chloride and said non-chlorinated solvent is xylene.

* * * * *